United States Patent
K V et al.

(10) Patent No.: US 9,819,911 B2
(45) Date of Patent: Nov. 14, 2017

(54) HOME, OFFICE SECURITY, SURVEILLANCE SYSTEM USING MICRO MOBILE DRONES AND IP CAMERAS

(71) Applicant: Honeywell International Inc., Morristown, NJ (US)

(72) Inventors: Vijaya Krishna K V, Badiyadka (IN); Bharat Balaso Khot, Bangalore (IN); Eric Oh, Syosset, NY (US); Bikram Swain, Berhampur (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 19 days.

(21) Appl. No.: 14/797,303

(22) Filed: Jul. 13, 2015

(65) Prior Publication Data

US 2017/0019644 A1 Jan. 19, 2017

(51) Int. Cl.
| | |
|---|---|
| *G01C 22/00* | (2006.01) |
| *G05D 1/00* | (2006.01) |
| *H04N 7/18* | (2006.01) |
| *B64C 39/02* | (2006.01) |
| *B64D 47/08* | (2006.01) |
| *G01C 21/20* | (2006.01) |
| *H04N 5/232* | (2006.01) |

(Continued)

(52) U.S. Cl.
CPC ............ *H04N 7/185* (2013.01); *B64C 39/02* (2013.01); *B64C 39/024* (2013.01); *B64D 47/08* (2013.01); *G01C 21/20* (2013.01); *G05D 1/00* (2013.01); *G08B 13/19697* (2013.01); *H04N 5/23296* (2013.01); *H04N 5/77* (2013.01); *H04N 5/91* (2013.01); *B64C 2201/024* (2013.01); *B64C 2201/127* (2013.01); *G08B 13/1965* (2013.01); *G08B 13/19621* (2013.01); *G08B 25/14* (2013.01)

(58) Field of Classification Search
CPC ...... H04N 7/185; H04N 5/23296; H04N 5/77; H04N 5/91; B64C 39/024; B64C 2201/024; B64C 2201/127; B64D 47/08; G01C 21/20; G05D 1/00
USPC ........................................................ 701/1, 26
See application file for complete search history.

(56) References Cited

U.S. PATENT DOCUMENTS

| | | | | |
|---|---|---|---|---|
| 2008/0144884 | A1* | 6/2008 | Habibi | G01C 11/02 382/103 |
| 2014/0140575 | A1* | 5/2014 | Wolf | G06K 9/3233 382/103 |

(Continued)

FOREIGN PATENT DOCUMENTS

| | | | | |
|---|---|---|---|---|
| WO | WO 2015179120 A1 * | 11/2015 | | G08B 25/00 |
| WO | WO 2016/059213 A1 | 4/2016 | | |

(Continued)

OTHER PUBLICATIONS

Extended European search report for corresponding EP patent application 16177620.8, dated Nov. 29, 2016.

*Primary Examiner* — Jaime Figueroa
(74) *Attorney, Agent, or Firm* — Husch Blackwell LLP

(57) ABSTRACT

A system is provided that includes a security system that protects a secured geographic area including at least a building, a wireless helicopter drone, a camera carried by the drone and a processor of the security system that controls a geographic location of the drone based upon threats detected within the secured area and that records video via the camera from the controlled location.

15 Claims, 1 Drawing Sheet

(51) Int. Cl.
    *H04N 5/77*     (2006.01)
    *H04N 5/91*     (2006.01)
    *G08B 13/196*     (2006.01)
    *G08B 25/14*     (2006.01)

(56) References Cited

U.S. PATENT DOCUMENTS

| | | | |
|---|---|---|---|
| 2015/0339912 A1* | 11/2015 | Farrand | G08B 25/00 340/501 |
| 2016/0026729 A1* | 1/2016 | Gil | H04L 63/1416 726/23 |
| 2016/0028605 A1* | 1/2016 | Gil | H04L 41/0833 709/213 |
| 2016/0107749 A1* | 4/2016 | Mucci | B64C 39/024 701/3 |
| 2016/0116914 A1* | 4/2016 | Mucci | G05D 1/101 701/2 |

FOREIGN PATENT DOCUMENTS

| | | |
|---|---|---|
| WO | WO 2016/059214 A1 | 4/2016 |
| WO | WO 2016/145447 A1 | 9/2016 |

\* cited by examiner

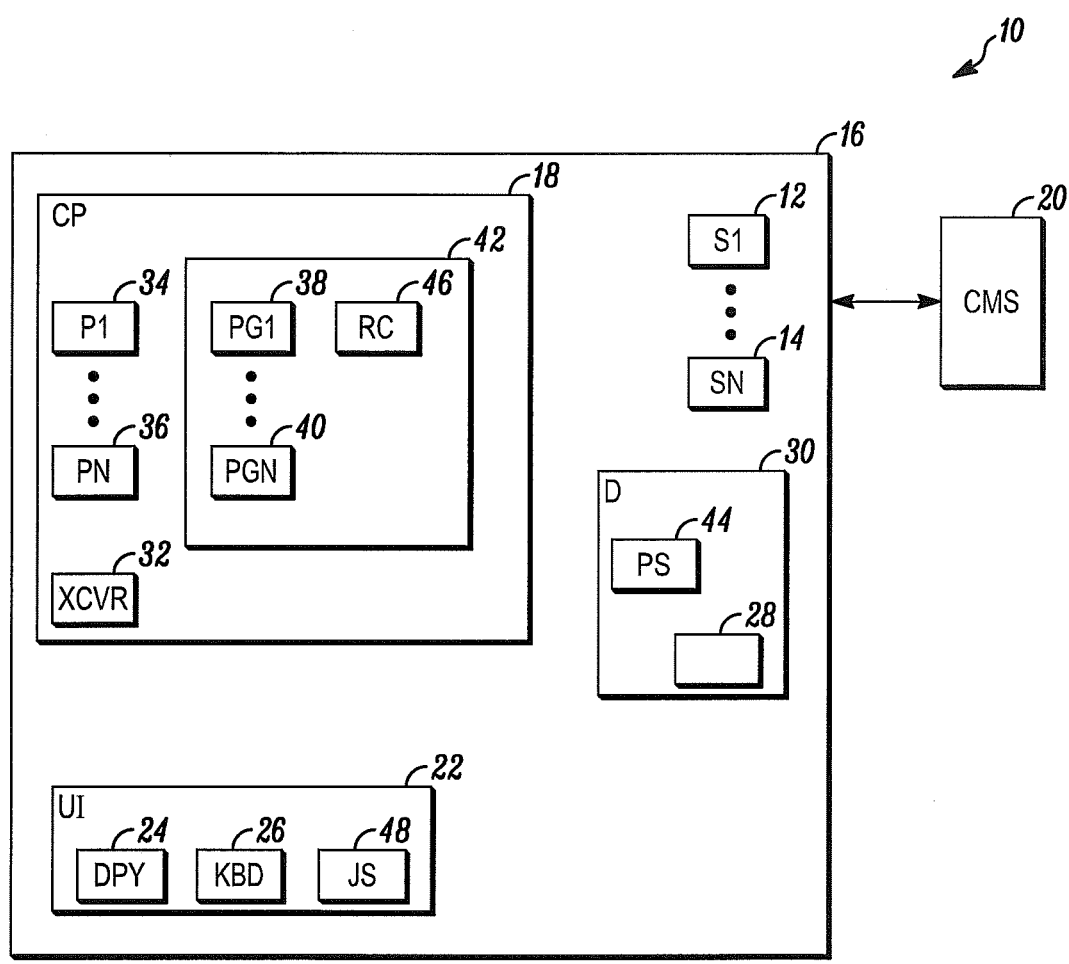

HOME, OFFICE SECURITY, SURVEILLANCE SYSTEM USING MICRO MOBILE DRONES AND IP CAMERAS

FIELD

This application relates to security systems and, more particularly, to surveillance systems.

BACKGROUND

Systems are known to protect people and assets within secured areas. Such systems are typically based upon the use of one more wireless sensors that detect threats within the secured areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within an area. Intruders have also been known to injure or kill people living within the area.

In the case of intruders, sensors, such as one or more cameras, may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While conventional security systems work well, it is sometimes difficult to analyze threats. Accordingly, a need exists for better methods and an apparatus for capturing images of threat situations.

BRIEF DESCRIPTION OF THE DRAWINGS

FIG. 1 illustrates a block diagram of a security system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 depicts a security system 10 shown generally in accordance with an illustrated embodiment. Included within the system are a number of threat detectors 12, 14 that detect threats within a secured geographic area 16. The threat detectors may be embodied under any of a number of different formats. For example, at least some of the detectors may be switches placed on doors and/or windows surrounding the secured area in order to detect intruders. Other detectors may be embodied as passive infrared (PIR) sensors or video cameras with motion detection capability placed within an interior of the secured area in order to detect intruders who have been able to circumvent the detectors placed along the periphery.

Still other of the detectors may detect environmental threats. For example, some of the other detectors may be fire or toxic gas detectors.

The threat detectors may be monitored by a control panel 18. The control panel may be located within the secured area as shown in FIG. 1 or located remotely. Upon detection of activation of one of the threat detectors, the control panel sends an alarm message to a central monitoring station 20. The central monitoring station may respond by summoning the appropriate help (e.g., fire department, police, etc.).

The system may be controlled via a user interface 22. For example, an authorized user may arm or disarm the system by entering a personal identifier (PIN) through a keyboard 26 followed by activation of a function key. Status information (e.g., armed, disarmed, etc.) may be shown on a display 24.

The detectors may also include a camera 28 carried by a wireless helicopter drone 30. The drone is controlled through the control panel via respective radio frequency (RF) transceivers 32 located within the drone and the control panel.

Included within the control panel, the user interface, and the drone may be circuitry that accomplishes the functionality described below. For example, the control panel, user interface, and drone may each include one or more processor apparatus (processor) 34, 36 each operating under control of one or more computer programs 38, 40 loaded from a non-transitory computer readable medium (memory) 42. As used herein, reference to a step performed by a computer program is also reference to the processor executing that step of the program.

In this regard, an alarm processor may monitor a status of each of the detectors. Upon detecting activation of one of the detectors, the processor may compose an alarm message to be sent to the central monitoring station. The alarm message may include an identifier of the system (e.g., an address, account number, etc.), an identifier of the activated detector, an indicator of the type of the activated detector (e.g., fire, gas, intruder, etc.), and a time.

A status processor may establish a system status by monitoring the user interface. Upon detecting entry of a predetermined PIN and arm key, the system enters an armed status. Similarly, upon detecting entry of a predetermined PIN and disarm key, the system enters a disarmed status.

Similarly, a communication processor forms a connection between the control panel and drone. The connection may be established through one or more wireless access points using the RF transceivers under an IEEE 802.15.4 protocol and/or 6LowPAN/IPv6/Iot protocol.

Under one illustrated embodiment, a monitoring processor associated with the security system captures images of the secured area via the drone and drone camera. Under the embodiment, a positioning system 44 (e.g., a GPS) of the drone provides positioning information (i.e., geographic coordinates) on a real time basis to the control panel. A routing processor of the security system uses the positioning information from the drone to control a position of the drone based upon threats within the secured area. For example, the routing processor may retrieve a set of geographic coordinates from a file 46 saved within memory to automatically route the drone through three-dimensional (3D) space within the secured area to the area of a detected threat in order to capture images of the threat.

Preset or pre-saved routes previously saved and retrieved from memory may define a number of routes through the secured area. For example, opposing sides of a hallway may define the outside limits of a route along the hallway from a front entrance to a back bedroom of a house with a programmed route following the center of the hallway. Another pre-saved route may define a security patrol along a perimeter of the secured area.

Also included within the preset and/or pre-saved routes may be a set of pan, tilt, and zoom (PTZ) positions of the camera carried by the drone for each location along the routes. As the drone travels along each of the routes, the PTZ positions are retrieved from memory and used to position the camera for recording video from each location along the routes. The recorded video may be saved within the drone or transmitted back to the control panel.

Under another embodiment, a joy stick 48 may be provided for control of the drone and/or camera. Using the joy stick, the user may independently route the drone to other locations based upon the exigent needs of a situation. As the user routes the drone through the space, the user may also separately adjust the PTZ positions of the camera and record video as necessary.

In general, the system of FIG. 1 offers a number of advantages over conventional systems. For example, conventional Internet Protocol (IP) cameras are installed at fixed locations and cannot be used to cover entire houses or office premises. The installed locations may not always be optimized and inherently include range limitations.

In addition, conventional security systems cannot track suspicious activity with static cameras other than by using the limited capabilities of the PTZ range of motion of a fixed camera. Conventional systems cannot visualize events in real time and cannot follow-up and track suspicious people through a premises. In the case of an alarm, human intervention is often needed to determine whether an alarm is an actual alarm or false alarm.

Conventional cameras cannot view an entire house (inside/outside) from different remote locations where static cameras are used. Conventional systems cannot provide home and/or office surveillance that is dynamic, real-time, and mobile.

The use of WiFi and/or RF6 can be used to control the drone from very large distances. This allows the security system to be integrated with a drone system using live streaming and a reliable position control mechanism. This allows a user to move the camera to an area of interest/event/alarm/activity/motion based upon an event trigger and automatically begin recording video. The user can specify a path for traversal to a desired recording destination using a home controller and joystick. Alternatively, the drone may use an event specific surveillance path based upon one or more routes saved in memory. A simple joystick controller with corresponding mobile applications can be employed by the user to control the camera position and movement in real time.

The drone of FIG. 1 can be used in a number of different ways. It can be used to perform peripheral security. It can also be used for event specific, real time security monitoring. Different analytics, such as motion detection, can be used to identify and detect threats. The solution offered by FIG. 1 provides more dynamic and diverse real-time data for security personnel. Users can customize the system for video recording of particular areas at different intervals when the system is armed or in support of any other randomly initiated activity.

The system of FIG. 1 offers a significant advance in real time monitoring using mobile drones with IP cameras for home surveillance. The system provides on the spot immediate data capture of unexpected events. The drone can also be used for automatic, predefined, regular, daily, scheduled surveillance. The user can provide a custom path for indoor monitoring, outdoor monitoring, etc. This provide a simplified surveillance mechanism for larger houses, multi-floor systems, and remote locations without easy access.

The system can also provide indoor and outdoor surveillance in order to keep track of assets. The system can be used in healthcare situations to track the condition of patients. Camera images can be analyzed in real time using face recognition analytics to evaluate threats posed by individual suspects. The drone may be provided with two-way communications features for exchanging audio with unknown persons. The system can be used in commercial plants and for watching remote areas.

In general, the system includes a security system that protects a secured geographic area including at least a building, a wireless helicopter drone, a camera carried by the drone, and a processor of the security system that controls a geographic location of the drone based upon threats detected within the secured area and that records video via the camera from the controlled location.

Alternatively, the system includes a security system that protects a secured geographic area, a plurality of sensors of the security system including at least one sensor that detects intruders entering the secured area, a wireless helicopter drone, a camera carried by the drone, and a processor of the security system that detects activation of one of the plurality of sensors, that controls a geographic location of the drone within the secured area based upon the activated sensor, and that records video via the camera from a location of the activated sensor.

Alternatively, the system includes a security system that protects a secured geographic area, a plurality of sensors of the security system including at least one sensor that detects intruders entering the secured area, a wireless helicopter drone, a camera carried by the drone, a processor of the security system that detects activation of one of the plurality of sensors, that automatically controls a geographic location of the drone based upon the activated sensor, and that records video via the camera proximate the activated sensor, and a joystick of the security system that provides at least some instructions for control of the drone or camera.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the FIGUREs do not require the particular order shown or sequential order to achieve desirable results. Other steps may be provided, steps may be eliminated from the described flows, and other components may be added to or removed from the described embodiments.

The invention claimed is:

1. A system comprising:
 a security system that protects a secured geographic area including at least a building;
 a wireless drone;
 a camera carried by the wireless drone; and
 a processor of the security system that retrieves, from a memory of the security system, a pre-saved route to direct the wireless drone to a first specific geographic location within the secured geographic area, wherein the pre-saved route is based upon a second location of threats detected within the secured geographic area and a current location of the wireless drone, and wherein the pre-saved route includes camera position information used to position the camera for recording video, via the camera, from specific positions along the route.

2. The system as in claim 1 further comprising a positioning system carried by the wireless drone.

3. The system as in claim 2 wherein the positioning system includes a GPS device.

4. The system as in claim 1 wherein the pre-saved route includes outside limits defined by opposing sides of a hallway through the secured geographic area.

5. The system as in claim 1 further comprising one or more threat sensors within the secured geographic area, wherein the one or more threat sensors detect the threats and send the second location of the threats to the processor.

6. The system as in claim 5 wherein the one or more threat sensors include one or more of fire sensors, intrusion sensors, and toxic gas detectors.

7. A system comprising:
a security system that protects a secured geographic area;
a plurality of sensors of the security system, wherein at least one of the plurality of sensors detects intruders entering the secured geographic area;
a wireless drone;
a camera carried by the wireless drone; and
a processor of the security system that detects an activation of the at least one of the plurality of sensors, receives a geographic location of a threat from the at least one of the plurality of sensors, receives a current location of the wireless drone, and retrieves, from a memory of the security system, a pre-saved route to direct the wireless drone to the geographic location within the secured geographic area,
wherein the pre-saved route includes camera position information used to position the camera for recording video, via the camera, from the geographic location.

8. The system as in claim 7 wherein the plurality of sensors include one or more of fire sensors, smoke detectors, and toxic gas sensors.

9. The system as in claim 7 wherein the pre-saved route includes one or more maps of the secured geographic area.

10. The system as in claim 9 wherein the one or more maps include at least one defined pathway to the geographic location.

11. The system as in claim 10 wherein the at least one defined pathway includes a hallway.

12. The system as in claim 9 further comprising a user input device that receives control instructions.

13. The system as in claim 9 further comprising a WiFi or RF6 wireless interface that couples the wireless drone to the security system.

14. A system comprising:
a security system that protects a secured geographic area;
a plurality of sensors of the security system, wherein at least one of the plurality of sensors detects intruders entering the secured geographic area;
a wireless drone;
a camera carried by the wireless drone;
a processor of the security system that detects an activation of the at least one of the plurality of sensors, receives a geographic location of a threat from the at least one of the plurality of sensors, receives a current location of the wireless drone, and retrieves, from a memory of the security system, a pre-saved route to direct the wireless drone to the geographic location; and
a joystick of the security system that provides at least some instructions for control of the wireless drone or the camera,
wherein the pre-saved route includes camera position information used to position the camera for recording video, via the camera, from the geographic location.

15. The system as in claim 14 wherein the joystick controls one or more of a pan, tilt, and zoom of the camera.

* * * * *